ration of New York

2,859,203
TOUGH, IMPACT-RESISTANT RESINS

Edmond Frank Fiedler, Adams, and Frank Paul Florentine, Jr., Stockbridge, Mass., assignors to General Electric Company, a corporation of New York No Drawing. Application February 23, 1955
Serial No. 490,124

6 Claims. (Cl. 260—51)

This invention relates to tough, impact-resistant resins and more particularly to tough, impact-resistant resins produced from mixtures of certain alkylated hydroxy aromatic compositions, a phenol and hexamethylenetetramine.

The reaction of hexamethylenetetramine with an alkylated phenol, i. e., a wax phenol, to yield resinous products is now well known to the art. However, these products have limited utility as plastics due to their poor dimensional stability at elevated temperatures. More specifically, these products exhibit low heat distortion characteristics, rendering them unacceptable for many applications.

Unexpectedly, we now have found that substantially improved products can be obtained by the addition of a phenol to a polyarylated aliphatic hydrocarbon, hereinafter referred to as a spaced polyphenol and defined in greater detail below, containing a substantial proportion of mono- and dialkylated phenol groups and subsequent reaction of the mass with hexamethylenetetramine at a temperature of from about 50 to about 180° C. Although the resulting product is a tough, resistant material when heated to the completion of the condensation reaction, it is preferred to arrest the condensation at an intermediate point to yield resins which are still fusible and soluble. These can subsequently be mixed with suitable fillers or dissolved in solvents to produce products which can be condensed to the final state referred to above. In general, the inclusion of a phenol permits a broad modification of the properties of the spaced polyphenolhexamethylenetetramine reaction product. More particularly, we have found that a higher proportion of a phenol relative to the spaced polyphenol gives harder, stronger, less flexible resins, whereas lower proportions of a phenol give soft, more flexible and somewhat weaker resins.

The term "spaced polyphenols" as used throughout this specification refers to a complex mixture of many molecular species and isomers containing in the main substantial proportions of relatively long hydrocarbon chains substituted with two or more phenolic residues. In general, the spaced polyphenols employed in the process of this invention may be prepared by alkylating a phenolic compound with a mixture of chlorinated, long-chain hydrocarbons in the presence of a Friedel-Crafts catalyst, the reactants being present in such proportions that the combined chlorine-to-phenol ratio is from 0.1 atom of chlorine per mole of phenol up to 2.0 atoms of chlorine per mol of phenol. By using such proportions, the spaced polyphenols employed herein contain substantial proportions of mono- and dialkylated phenol residues. More particularly, the spaced polyphenols contain alkylated phenol residues having free ortho or para positions which readily are available for reaction with hexamethylenetetramine. Spaced polyphenols made with the chlorine-to-phenol ratio herein employed exhibit appreciably higher reactivity toward formaldehyde or hexamethylenetetramine than do spaced polyphenols made using a chlorine-to-phenol ratio of two or higher.

The mixture of chlorinated, long-chain hydrocarbons found eminently suitable for alkylating phenols as described above include chlorinated hydrocarbons having from about 12 to about 30 carbon atoms per molecule and a chlorine content of from about 15 to about 45 percent of chlorine by weight of the chlorinated hydrocarbon. Included in this class are the paraffinic hydrocarbon waxes and oils of the aforesaid carbon chain lengths and chlorine contents.

The phenolic compounds which may be alkylated to prepare the spaced polyphenols as described above include phenol, and mono-substituted alkyl phenols, for example, methyl, ethyl, propyl, etc.-substituted phenols, mono-halogenated phenols and mono-alkoxy phenols such as methoxy, ethoxy, etc. phenols.

In carrying out the alkylation reaction to obtain the spaced polyphenols herein employed, a preferred method is that described and claimed in the copending application of Hathaway, Serial No. 480,607, filed January 7, 1955, now U. S. Patent 2,800,512 and assigned to the assignee of the present invention. In accordance with this method, a Friedel-Crafts catalyst is added to hot phenol, or, alternatively, hot phenol is added to a Friedel-Crafts catalyst, at a moderate temperature of from about 50° to about 75° C. and a chlorinated hydrocarbon thereafter gradually added to this mixture. The temperature maintained during the second phase of the reaction, more specifically during chlorinated hydrocarbon addition, may range from about 100° to about 200° C. with a range of from about 140° C. to 175° C. being preferred. Alternatively, any of the commercially feasible processes now available for alkylating a phenol compound may be employed.

Phenolic compounds which may be employed in the process of this invention include, in addition to phenol, the phenols mentioned previously as suitable in the preparation of the spaced polyphenols.

In preparing the resins of the present invention, the ratios of phenolic compound to spaced polyphenol can be varied quite widely in the reaction with hexamethylenetetramine, depending upon whether relatively hard or relatively soft final cured resinous products are desired. Thus, for softer, more flexible cured resins, five percent, by weight, of a phenolic compound can be admixed with 95 percent, by weight, of the spaced polyphenol. Tougher, harder, less flexible, cured resins are obtained by admixing 95 percent, by weight, of an ordinary phenolic compound with 5 percent, by weight, of the spaced polyphenol. Between these limits, products of intermediate properties are obtainable.

The quantity of hexamethylenetetramine which may be employed for reaction with mixtures of the phenolic compound and the spaced polyphenol will vary depending upon the relative proportions of phenol and spaced polyphenol employed and upon the composition of the spaced polyphenol. In general, the preferred quantity of hexamethylenetetramine is such that the number of methylene groups (in the hexamethylenetetramine) is equivalent to one-half the total number of free ortho and para positions available on the phenol molecules and phenolic residues (in the spaced polyphenol) up to a number of methylene groups equivalent to the available reactive ortho and para phenolic positions. More particularly, depending upon the particular mixture of phenolic compound and spaced polyphenol employed, from about 2.3 to about 75 parts of hexamethylenetetramine may be used per 100 parts of phenol-spaced polyphenol mixture.

In effecting the reaction of hexamethylenetetramine with mixtures of a phenolic compound and a spaced polyphenol, the reaction temperature may be varied within certain limits. More specifically, reaction may be effected by heating at temperatures of from about 50 to about 180° C. Generally, the first reaction products obtained are fusible, soluble resins. Upon further heating (at from 100° to about 200° C.), the fusible, soluble resins are transformed into the final thermoset (i. e., insoluble and infusible) stage.

In order that those skilled in the art may more readily understand the present invention, the following examples are given by way of illustration and not by way of limitation. All parts and percentages are by weight.

EXAMPLE 1

A flexible resin was prepared from the following formulation:

| | Parts |
|---|---|
| 2–20 [1] spaced polyphenol | 15.0 |
| Phenol | 15.0 |
| Hexamethylenetetramine | 6.54 |

[1] First digit represents number of chlorine atoms to one mol of phenol used in preparation of spaced polyphenol (in this case based on chlorinated paraffin wax); second digit represents per cent chlorine in chlorinated hydrocarbon wax used to prepare spaced polyphenol.

The above mixture was heated at 110° C. with stirring for from one to one and one-half hours. On cooling, a solid, dark brown resin resulted which was not grindable but which could be broken by a sharp blow. The stroke cure of this resin on a hot plate of 150° C. was five minutes, yielding a flexible film. The fusible resin was cured to a clear, homogeneous, rather flexible and infusible resin in less than 30 minutes at 150° C.

EXAMPLE 2

In the manner of Example 1, another flexible resin was prepared from the following formulation:

| | Parts |
|---|---|
| 1.7–19 spaced polyphenol | 200 |
| Phenol | 200 |
| Hexamethylenetetramine | 80 |

The reaction mixture was heated at 115° C. to incipient gelation. The cold product was ground and mixed with an equal weight of wood flour and 1 percent, by weight, based on the weight of total mixture, of zinc stearate. This mixture was sheeted on differential rolls for 5 minutes at 250° F. The sheet was broken up and compression molded for 20 minutes under 4000 p. s. i. at 320° F. The Dynstat impact of the molded product was compared with that of several standard phenolic materials prepared in the same manner, each having a different filler. The results of these tests are found in Table I which follows:

Table I

| Compound: | Dynstat impact |
|---|---|
| Product of Example 2 | 0.052 |
| Wood flour filled phenolic | 0.037 |
| Cotton flock wood flour filled phenolic | 0.036 |

The results of these tests clearly demonstrate the superior impact strength of the products of this invention.

EXAMPLE 3

In the manner of the foregoing examples, another resin was prepared from the following formulation:

| | Parts |
|---|---|
| 1–20 spaced polyphenol | 5 |
| Phenol | 5 |
| Hexamethylenetetramine | 2 |

The resin obtained by reacting the foregoing mixture at 110–120° C. was compounded with an equal weight of wood flour and 1 percent, by weight, of zinc stearate. This mixture was sheeted on differential rolls heated to 250° F. for 20 minutes. The sheet was broken up and the flaked material molded in the manner described in Example 2. A molded product of this example and a comparable conventional phenolic molded product were subjected to physical and electrical tests. The results are shown in Table II which follows:

Table II

| Property | Molded Product of Example 3 | Molded Conventional Phenolic |
|---|---|---|
| Impact | 0.065–0.070 | 0.045 |
| Flexural | 8,000–9,000 | 8,000–9,000 |
| Heat distortion, ° C | 155 | 180 |
| Electricals: | | |
| Dielectric Strength at 1,000 kc.— | | |
| S/T | 384 | 300–350 |
| S/S | 346 | 100 |
| Power factor, percent | 2.5 | 5 or > |

The foregoing results clearly demonstrate that the resin of the invention is at least 50 percent stronger in impact resistance and equal in flexural strength. As would be expected of a more flexible product, the heat distortion temperature is somewhat lower. The dielectric strength, both S/T and S/S, is substantially better and the power factor is considerably better, being half or less.

The molded product of Example 3 was compared with three spaced polyphenol-hexamethylene molded products for impact strength, flexural strength and heat distortion. The results are listed in Table III which follows:

Table III

| Molded Products | Impact | Flexural | Heat Distortion, ° C. |
|---|---|---|---|
| Product of Example 3 | 0.065–0.070 | 8,000–9,000 | 155 |
| 1–20 spaced polyphenolhexamethylenetetramine reaction product, wood flour filled | 0.10 | <1,000 | <25 |
| 1–25 spaced polyphenolhexamethylenetetramine reaction product, wood flour filled | 0.060 | 5,700 | 105 |
| 2–25 spaced polyphenolhexamethylenetetramine reaction product, wood flour filled | 0.085 | 4,800 | 85 |

The results listed in Table III demonstrate the overall superiority of the products of the invention. While the 2–25 spaced polyhenol-hexamethylenetetramine product has higher impact strength, the flexural strength and heat distortion are unsatisfactorily low. The only product exhibiting high impact, high flexural and high heat distortion is that of Example 3.

As illustrated above, the fusible resins are useful for compounding with fillers such as wood flour, asbestos, cotton flock, etc. into molding compounds. Such molding compounds can be press-molded, following usual procedures to give molded articles which show improved toughness and impact resistance as well as improved electrical properties over molding based on conventional phenolic resins.

In addition to their use in preparing molding compounds, the fusible resins of this invention can also be used to impregnate fibrous sheet material such as paper or cotton cloth, either by a hot-melt process or by first dissolving a fusible resin in a suitable solvent and then employing the resulting solution to impregnate the fibrous sheet material. Suitable solvents for the fusible resins are ketones, esters and alcohols or mixtures thereof, with or without aromatic hydrocarbon solvents such as toluene and xylene. The impregnated fibrous sheet material can be laminated in a press in accordance with usual procedures to give laminates having improved flexibility, toughness and punchability as compared to laminates based on conventional resins. The fusible resins of this invention can be also used to impregnate other porous industrial products such as woven asbestos brake bands and articles made of wood or plaster.

As an additional use, the fusible resins of this invention can also be dissolved in suitable solvents such as ketones, esters or alcohols or mixtures thereof with aromatic hydrocarbons and the resulting solutions used as baking varnishes. More particularly, such varnishes are extremely useful as electrical insulating varnishes because the baked film exhibits improved properties of toughness and flexibility as compared to conventional phenolic varnishes.

What we claim as new and desire to secure by Letters Patent of the United States is:

1. The method of preparing fusible, soluble, thermosetting, resinous, reaction products by reacting at a temperature of from about 50 to about 180° C., (1) from about 5 to about 95 percent, by weight of the reaction mixture, of spaced polyphenols, said spaced polyphenols comprising (a) the product of heat reacting in the presence of a Friedel-Crafts catalyst, a monohydroxy benzene compound selected from the group consisting of monohydroxy benzene and substituted monohydroxy benzene in which the substitution is selected from the group consisting of alkyl groups, alkoxy groups, and halogen radicals and (b) a mixture of long-chain chlorinated hydrocarbons containing from about 12 to 30 carbon atoms per molecule and from about 15 to about 45% of chlorine, by weight of the chlorinated hydrocarbons, the reactants being present in such proportions that the combined chlorine to phenol ratio is from 0.1 atom of chlorine per mol of phenol up to two atoms of chlorine per mol of phenol, (2) from about 5 to about 95 percent by weight of the reaction mixture, of a phenol selected from the class consisting of phenol and substituted monophenols, in which the substitution is selected from the group consisting of alkyl groups, alkoxy groups and halogen radicals, and (3) a sufficient quantity of hexamethylenetetramine to give a number of methylene groups equivalent to from ½ the total number of free ortho and para positions in the phenol and monohydroxy benzene rings in the spaced polyphenol up to a number of methylene groups equivalent to the total number of available reactive ortho and para positions on the monohydroxy benzene rings present in the spaced polyphenols and the phenol.

2. A fusible, soluble, thermosetting, resinous, reaction product produced in accordance with the method of claim 1.

3. The cured, thermoset, insoluble and infusible resins obtained by heating at from 100° to about 200° C. the fusible, resinous, reaction products produced in accordance with the method of claim 1.

4. A molding compound comprising the fusible, resinous, reaction products prepared in accordance with the method of claim 1 and a fibrous filler material.

5. As new articles of manufacture, molded articles prepared by curing under heat and pressure a molding compound comprising the fusible, resinous, reaction products of claim 1 and a fibrous filler material.

6. A laminate comprising fibrous sheet material impregnated and bonded with the resinous reaction product of claim 1.

References Cited in the file of this patent

UNITED STATES PATENTS

| | | |
|---|---|---|
| 2,178,571 | Flett | Nov. 7, 1938 |
| 2,298,866 | Burnett | Oct. 13, 1942 |
| 2,416,218 | Reiff | Feb. 18, 1947 |